United States Patent [19]

Misrahi et al.

[11] 4,305,381
[45] Dec. 15, 1981

[54] SOLAR AIR COLLECTOR

[76] Inventors: Eddy Misrahi, 192 rue Principale, Delson, Quebec, Canada, J0L 1G0; Denis Deschenes, 5625 Platon, Apt. 316, Brossard, Quebec, Canada, J4W 2P9

[21] Appl. No.: 109,553

[22] Filed: Jan. 4, 1980

[51] Int. Cl.³ .............................................. F24J 3/02
[52] U.S. Cl. .................................... 126/430; 126/417; 126/429; 126/436; 126/452; 126/450; 165/104.17; 165/104.19
[58] Field of Search ............... 126/436, 430, 450, 400, 126/401, 417, 452, 432, 434, 439, 428, 429; 165/48 S, 104 S

[56] References Cited

U.S. PATENT DOCUMENTS

| | | | |
|---|---|---|---|
| 3,946,720 | 3/1976 | Keyes et al. | 126/418 |
| 4,086,911 | 5/1978 | Futch | 126/422 |
| 4,088,266 | 5/1978 | Keyes | 126/429 |
| 4,089,325 | 5/1978 | Brola | 126/439 |
| 4,094,299 | 6/1978 | Voelker | 126/449 |
| 4,132,221 | 2/1979 | Orillion | 126/439 |
| 4,138,061 | 2/1979 | Besack | 126/436 |
| 4,183,350 | 1/1980 | Staudacher | 126/430 |
| 4,213,448 | 7/1980 | Hebert | 126/436 X |
| 4,250,871 | 2/1981 | Milburn, Jr. | 126/436 X |

*Primary Examiner*—Larry Jones
*Attorney, Agent, or Firm*—Oblon, Fisher, Spivak, McClelland & Maier

[57] ABSTRACT

A solar heating system including a radiant heat collector apparatus made up of an enclosure having glazed panels. The collector provided within the enclosure is upstanding with the enclosure and the collector has heat absorbent flat walls spaced inwardly from the glazed panels. A heat storage core is provided centrally within the collector and spaced from the walls of the collector. The heat storage core includes an insulated housing and a heat retaining member within the insulated housing. Air passageways are formed between the collector walls and the insulated housing for passing input air, and duct members are provided for communicating with a household.

13 Claims, 4 Drawing Figures

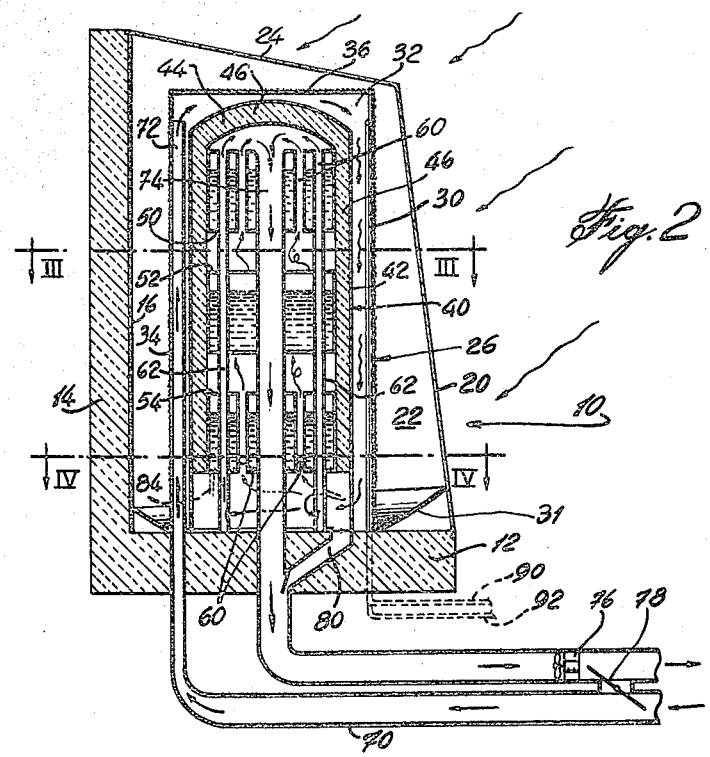
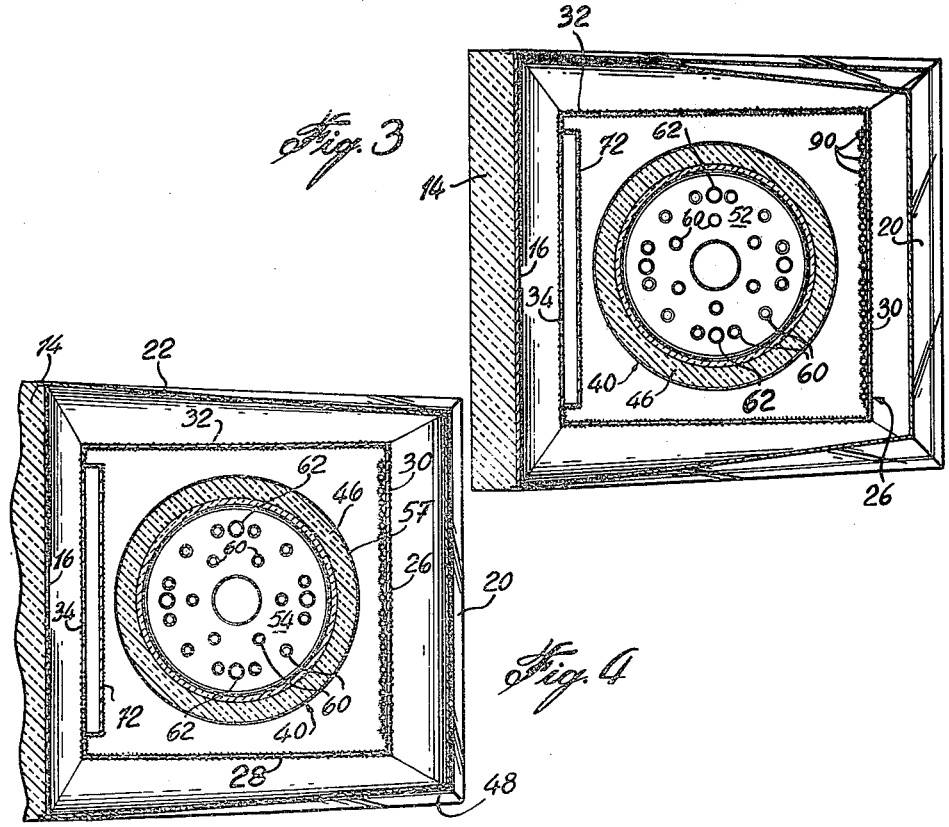

SOLAR AIR COLLECTOR

BACKGROUND OF THE INVENTION

1. Field of the Invention

The present invention relates to solar thermal energy collectors, and more particularly, to a collector which can be adapted for domestic use.

2. Description of the Prior Art

Heretofore, many developments have been made in the field of solar energy. To date, however, even considering the fact that oil is expensive and that the source is in the hands of relatively few countries, there is yet no practical collector which can be mass-produced for low price sale and installation at individual homes.

Most present day collectors are of the flat type which require expensive installation on roof tops, assuming the roof is properly oriented and at an angle. These flat collectors require considerable area with relatively low yield. The fact that they are laid out on the roof exposes them to the elements, and thus a fair amount of heat is lost on the roof before the heat is transferred by gas or liquid into the house.

SUMMARY OF THE INVENTION

It is the object of the present invention to provide an upstanding, compact, self-contained solar collector and heat storage unit adapted for household use which is efficient and at the same time of low cost.

Since the present invention has been made, applicant has been made aware of U.S. Pat. No. 4,138,061, Harold C. Besack, issued Feb. 6, 1979. This patent shows an upstanding integral solar collector with a heat storage system, but with a portion of the unit below ground. It is not readily apparent how the Besack unit can operate efficiently in a residential area where it can only project a short distance above the level of the ground and not be provided on a roof or on a stand to get the full benefit of exposure to the sun.

It is an aim of the present invention to provide an improved solar collection unit which is more efficient than present solar collection units.

A construction in accordance with the present invention includes a solar heating system including a radiant heat collector apparatus including an enclosure having glazed panels joined together, a collector provided within the enclosure and upstanding therewith, the collector including heat absorbent flat walls spaced inwardly from the glazed panels, a heat storage core provided centrally within the collector and spaced from the walls of the collector, the heat storage core including an insulated housing and a heat retaining member within the insulated housing, air passageways formed between the collector walls and the insulated housing for passing the input air, duct members communicating with a household or the like and the passageway, a member for passing air coming from the passageways of the solar collector through the heat storage core, and output duct members for passing heated air from the heat storage core to the household or the like.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2 is a vertical cross-section taken along line II—II of FIG. 1;

FIG. 3 is a horizontal cross-section taken along line III—III of FIG. 2; and

FIG. 4 is a horizontal cross-section taken along line IV—IV of FIG. 2.

DETAILED DESCRIPTION OF THE PREFERRED EMBODIMENTS

Figure 1:
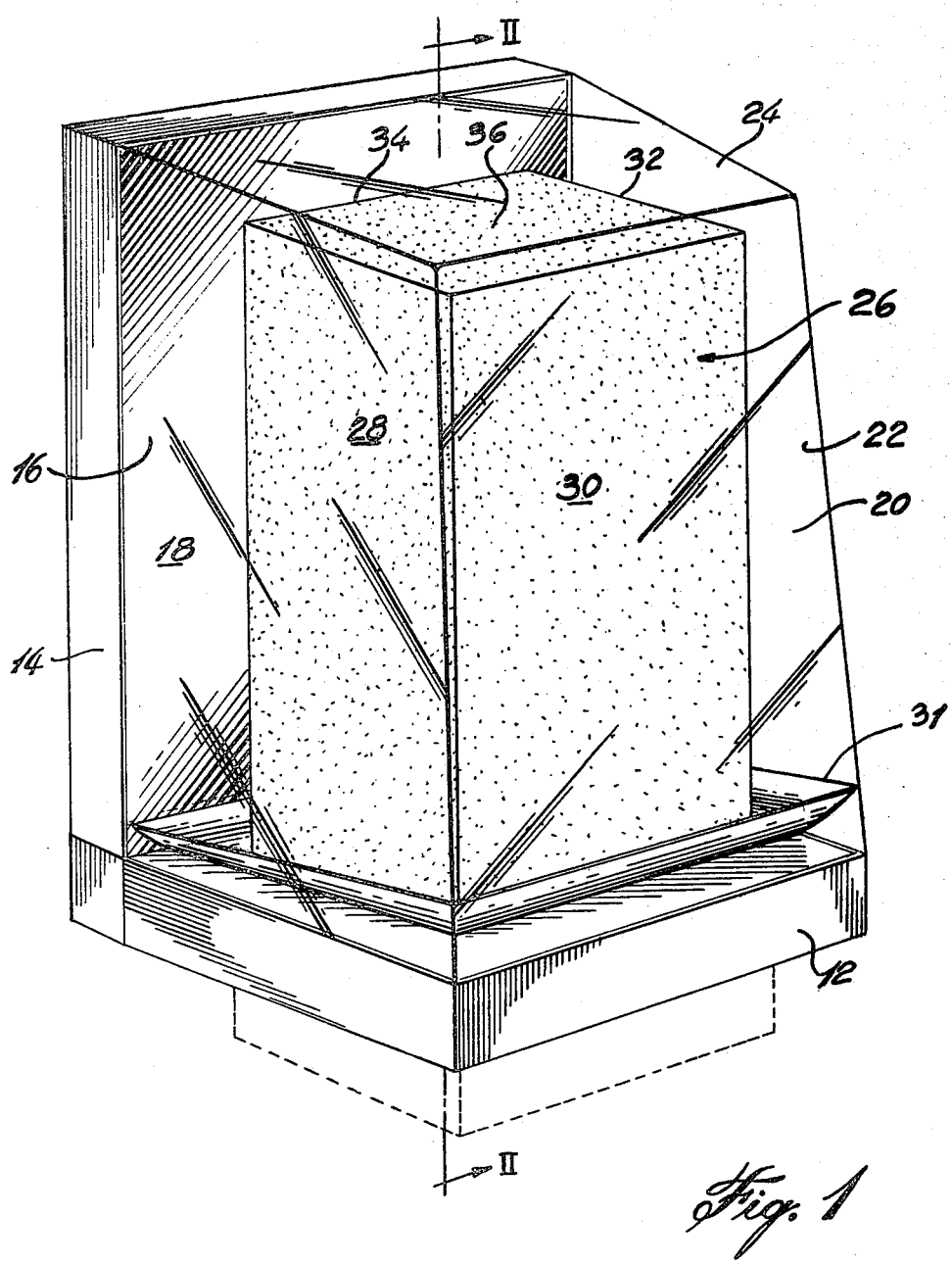
FIG. 1 is a perspective view of a typical solar converting device.

The embodiment illustrated in FIGS. 1 to 4 shows a self-contained solar heating unit 10 which can be adapted to be mounted on a stand near a house and can be placed in a rear yard of a house but near a wall thereof or can be placed on the roof of a flat-roof house. The unit has, as shown, a bottom wall 12 and a rear wall 14, the rear wall being at 90° to the bottom wall. A reflective surface 16 can be provided on the rear wall 14. The solar unit is constructed like a greenhouse, including side-glazed panels 18, 20 and 22, as well as a top-glazed panel. The side glazed-panels 18, 20 and 22 are placed at a slight angle to the vertical so as to obtain more direct exposure to the rays of the low winter sun. Depending on the geographical location of the installation of the solar unit 10, the glazed walls or panels 18, 20 and 22 would be at varying angles. Finally, a top-glazed panel 24 is also provided, closing the greenhouse enclosure of the unit 10. Each of the glazed panels 18, 20, 22 and 24 is flat and is hermetically sealed at its joints with the other panels as well as with the floor and rear wall 12 and 14 respectively.

Centrally within the enclosure there is provided a heat collector 26 which includes four rectangular panels 28, 30, 32 and 34. A square panel 36 forms the top of the heat enclosure unit 26. All of the panels are hermetically sealed to each other. Each of the panels may be formed of a sheeting material which has been blackened, either with carbon black or with a black paint. It has been found that the provision of sand mixed in the solution, such as paint, covering the sheeting will give a better yield since the sand will cause the paint to be roughened and present myriad small surfaces to absorb solar energy from the sun. It is noted that both the inner and outer surfaces of panels 28, 30, 32 and 34 are coated with the mixture of sand and black paint.

Reflective surfaces 31 are provided at the bottom between the glazed panels 18, 20, 22 and 24 and the panels 30, 32, 34 and 36. The reflective surfaces 31 are set at an angle to reflect sunlight inwardly towards the walls of collector 26. The angles vary between 20° and 30° from the horizontal. Underneath the reflective surfaces 31, moisture absorbing pads may be provided.

As shown in FIGS. 2 to 4, the interior of the collector device is somewhat hollow and includes in the middle thereof a cylindrical heat storage core 40 includes a housing. The heat storage core 40 has an outer cylindrical wall 42 and a dome-shaped top wall 44. The walls are provided with an insulating material 46 which will retain the heat within the heat storage core 40. The outer surface of core 40 is covered with a smooth reflective surface 57, such as aluminum sheeting. The interior of the insulating wall 42 is also provided with a similar sheeting. In the present instance, the heat storage core 40 includes, within its hollowed-out portion, three core segments 50, 52 and 54. Each of these core segments is adapted to receive and communicate with a water supply. A plurality of ducts 60 passes through each of the segments, and the inner surface of the ducts acts as a heat transfer surface from the air having been heated, as will be described, to heat the liquid, such as water, within the segments 50, 52 and 54. The water can be drawn off and circulated to heat some other utility.

In a true heat balance system, however, water may be replaced by wax or other known heat storage devices. In such a case, further heat transfer devices, such as metallic screening, are provided within the segments and connected to the ducts 60 and 62.

An input duct 70 communicates with the unit 10 through the bottom wall 12 and with a flat narrow duct 72 formed against the rear wall 34 of the collector unit 26. Fresh air is drawn upwardly through the duct 72, picking up heat from the rear wall 34, to the top portion of the collector device 26. The fresh air will thus pick up heat from the top wall 36 which then passes downwardly along the three other walls 28, 30 and 32 of the enclosure 26. The air so heated, that is, by passing through the duct 72, the top wall 36, and the side walls 28, 30 and 32, is drawn upwardly through the ducts 60 and 62 of heat storage core segments 50, 52 and 54 up into the dome 44 thereof, where the air is then drawn down through an exit duct 74. The exit duct includes a fan 76 for drawing the air through the system and forcing it into the house. A diverting valve or baffle 78 can be provided for shutting off the solar heating device, particularly at night time. When the valve 78 is closed, the fan might still operate in order to recirculate the air in the system. This would be useful, for instance, in summer when it is required to heat water for a hot water system. A bypass 80 can also be utilized rather than by passing the air through the ducting system 60, 62 and 74 so that the heated air can be sent directly through the exit duct 74.

In operation, the cool air from a household is drawn through the inlet duct 70 up through the duct 72 against the rear wall 34 which will heat some of the air going up through the duct 72. The air is force fed by the drawing power of fan 76 such that the cool air is, of course, moving upwardly in the duct 72 and will be drawn downwardly along the walls 28, 30 and 32 of the heat collector 26. The direction of air is counter-convection, as the air is absorbing more and more heat as it moves progressively within the system. These walls, of course, absorb considerable heat from the sun and thus the heat is transferred along its inner surfaces to the air passing therealong. The heated air then enters the heat storage core 40 through the bottom of the device and up through the ducts 60 and 62. Some of the ducts 62 conduct the air directly through the segments 50, 52 and 54 to the exit duct 74, that is, at the top of the exit duct. Other ducts 60 allow for the air to meander about the segments and find its way upwardly through the segments until it reaches the top of the storage device and is drawn downwardly through the exit duct 74 past the fan 76.

It is anticipated that as clouds pass and hide the sun, the air passing through the system can be continued since, although the solar collector 26 will be cooled down, the air will absorb heat from the heat storage core 40 as it passes through the ducts 60 and 62.

The heat storage core, therefore, provides the continuity of a relatively constant temperature of the air being forced into the house from the solar heating device. As long as the air passing through the system is hotter than the temperature of the wax or other material in the storage segments 50, 52 and 54, the heat will be dissipated from the air to the storage segments. However, as soon as the air is cooled down to below the average temperature of the core segments 50, 52 and 54, the reverse will occur, that is, heat will be absorbed by the air as it passes through the ducts 60 and 62, that is, heat coming from the storage core. The embodiment shown in the drawings does not illustrate a heat storage core which can store heat for later use since the heat storage core is relatively small. However, it is intended to utilize the heat storage core in a manner that will provide a relatively constant output temperature of the air drawn through the system and the duct 74.

It is recognized that the air space between the segments 50, 52 and 54 is important since the volume of air in these spaces is relatively large such that the velocity of the air flow through the various ducts is much greater than the flow of air from one segment to the other. Further, when the solar heating apparatus is not being utilized, the cooling down of the core is delayed considerably by the insulation effect of the air between the various segments. For instance, although segment 54 may be the first to cool down, the air in the area between segments 54 and 52 will insulate segment 52, thereby delaying the dissipation of the heat from the storage core segment 52 and so on up to the core segment 50. Accordingly, it has been found that the heat storage core does not completely cool down overnight, and thus when the system is put into operation in early morning, it can be preheated by the heat which is still retained in the upper segments in the core section 40. Small deflector plates or heat transfer fins can be provided (not shown) on the segments 50, 52 and 54 and extending within the air space between the segments. As previously indicated, the interior wall of the core is provided with a continuous reflecting surface such as a metal foil 55 so as to reflect the heat back into the air spaces of the core.

In the case where one wishes to bypass the storage device so that hot air is immediately sent into the household, then the bypass 80 can be utilized by closing the valve 81.

In warmer temperatures, the storage segments 50, 52 and 54 can be utilized for heating water for a hot water system in the household. A pipe 84 is illustrated communicating with the segment 54 and is representative of this alternative.

It is understood that this unit would probably not be sufficient for heating a household 24 hours a day, particularly in colder climates. However, the device can certainly be used as a supplement in the winter-time and also as described for the summertime for heating both hot water and for sending hot air into the household. Another manner of heating water would be to have hot water pipes 90 bringing cool water into the enclosure, and the pipes could be strewn along the inner surface of wall 30 as shown, and the return 92 would pass to the hot water system in the household.

Examples

A unit in accordance with the present invention has been tested. The enclosure was approximately 70 inches high, 40 inches wide, and 46 inches deep. The solar collector device 26 was 33 inches wide by 34 inches in depth. The height of the collector was roughly 66 inches, and the outside diameter of the storage device 40 was 24 inches while the inside diameter was 15 inches. The height of the storage device internally was approximately 55 inches. The exit duct was 5 inches in diameter as was the inlet duct.

Tests were carried out during the winter of 1979 that is between January and May 1979 with the unit located near the City of Montreal, Quebec, Canada, approximately 10 feet off the ground. Typically, with a clear sky and an outdoor temperature of −25° C. repeated and consistent results were obtained throughout the months of January and February 1979. The following is a sample of readings dated February 11 and 12, 1979. The blower horse power was ⅜ hp. The following are selected readings during that test:

| TIME | OUTSIDE TEMP. °C. | ENTRY TEMP. °C. | EXIT TEMP. °C. | ΔT °C. | CFM |
|---|---|---|---|---|---|
| Feb. 11/79 | | | | | |
| 10:20 | −22 | 19 | 27 | 8 | 310 |
| 11:00 | −21 | 20 | 28 | 8 | 310 |
| 11:55 | −20 | 21 | 28 | 7 | 310 |
| 13:00 | −20 | 27 | 7 | 310 | |
| 14:17 | −22 | 21 | 26 | 5 | 310 |
| 15:00 | −22 | 21 | 26 | 5 | 310 |
| 15:30 | −23 | 20 | 24 | 4 | 310 |
| 23:30 | −26 | — | 21 | — | OFF |
| Feb. 12/79 | | | | | |
| 07:00 | −30 | — | 16 | — | OFF |
| 09:00 | −20 | 11 | 15 | 4 | 310 |
| 09:30 | −20 | 18 | 21 | 3 | 310 |
| 10:00 | −20 | 20 | 24 | 4 | 310 |
| 10:30 | −18 | 19 | 26 | 7 | 310 |
| 11:00 | −18 | 19 | 26 | 7 | 310 |
| 12:15 | −15 | 20 | 27 | 7 | 310 |
| 12:45 | −15 | 20 | 27 | 7 | 310 |
| 13:00 | −14 | 20 | 27 | 7 | 310 |
| 14:10 | −15 | 20 | 27 | 7 | 310 |
| 15:00 | −15 | 20 | 26 | 6 | 310 |
| 15:30 | −16 | 20 | 24 | 4 | 310 |
| 15:55 | −16 | 20 | 22 | 2 | 310 |

The above data was collected during continuous daytime operation of the box collector. Readings were recorded using an Amprobe stripchart recorder, model T8101, an Alnor Velometer Type 3002 and many thermometers including a BK Digital thermometer connected to three probes:

outside temperature probe: located behind collector but exposed to incident lighting (+2° C. error), entry temperature probe: situated at the entry point of air into the conduit leading to the outside collector; approximately 5′ from outside wall, exit temperature probe; situated inside the collector at the exit point of air to the conduit.

The readings were taken at intervals of approximately 30 seconds.

Input and output conduits were insulated from each other. Air entered the system from a different room than the one into which it was exhausted. CFM rate was established with a Dwyer pocket gauge Model 460 and the Alnor Velometer was established by measuring each of 24 cross-section grid cells of a section of exit conduit and averaging readings taken with a Dwyer pocket gauge.

It can be seen that fairly efficient heating can be obtained with the unit constructed in accordance with the present invention.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A solar heating system for a household comprising:
   a radiant heat collector having an upstanding enclosure provided with flat glazed panels joined together,
   collector means provided within the enclosure and upstanding therewithin, said collector means including heat absorbent flat walls spaced inwardly from the glazed panels;
   a heat storage core provided centrally within the collector means and spaced from the walls of said collector, the heat storage core further comprising an insulated housing and heat retaining means within the housing,
   air passageways, for passing input air upwardly between the collector walls and the insulated housing,
   duct means communicating with said air passageways and with said household,
   means for passing air coming from the passageways through the wall of the housing and upwardly through the heat storage core, and
   output duct means for passing heated air from the heat storage core to the household.

2. A heating system as defined in claim 1 the glazed enclosure further comprising at least three flat glazed panels joined together and hermetically sealed, and the flat glazed panels being sloped inwardly slightly at an acute angle to the vertical.

3. A solar heating system as defined in claim 2 further comprising three side walls of the enclosure formed by said glazed panels and a top glazed panel forming the top wall, said glazed panels forming the side walls being sloped as a function of the median angle to the horizontal of the direction of the sun during winter months in a particular area.

4. A solar heating system as defined in claim 2 wherein the height of the glazed enclosure is greater than its width or depth.

5. A solar heating system as defined in claim 4, said collector means further comprising a rectangular prismatic box having flat sidewalls and a flat top wall, the whole being hermetically sealed from the space between the collector means and the glazed enclosure, the exterior and interior surfaces of the walls of the collector means being formed of roughened blackened material for enhancing the collection of radiant energy.

6. A solar heating system as defined in claim 5, further comprising reflecting panels positioned in the bottom of the glazed enclosure between the collector means and the glazed panels such as to reflect radiant energy onto the collector means.

7. A solar energy system as defined in claim 1 said duct means communicating with the passageways and with the input from the household and further comprising a duct located near one interior surface of a side wall of the collector means so as to deliver the air input to the passageway space at the top of the collector means; means in the output duct means for drawing the air through the solar heating system theeby drawing the air downwardly through the passageways between the inner surfaces of the collector sidewalls and the outer surfaces of the storage core insulating housing and thereby drawing the air through the heat storage core in an upward direction and finally through the output duct means from the heat storage core.

8. A solar energy system as defined in claim 7, further comprising a reflector surface on the insulating housing contacting said passageway between the housing and the inner surfaces of the walls forming the collector means.

9. A solar heating system as defined in claim 7, said output duct means communicating with a space formed near the top of the heat storage core so as to draw the air upwardly through the heat storage core.

10. A solar heating system as defined in claim 9, further comprising a plurality of small passageways formed in the heat storage core which impede and slow the passage of air being drawn therethrough.

11. A solar heating system as defined in claim 1, said heat storage core further comprising a plurality of core segments provided in axial spaced apart alignment in the upstanding elongated insulated housing, each of the spaced apart segments defining an air plenum therebetween and a plurality of small passageways defined through the segments to allow air from the passageways to pass therethrough thereby dissipating heat from the air heated in the passageways to the heat storage segments or for picking up heat from the heat storage segments if the air from the passageway is of a temperature less than the temperature of the heat storage segments and the output duct being provided centrally of the heat storage segments and communicating with an air plenum at the top of the core.

12. A solar heating system as defined in claim 7, further comprising bypass means for bypassing the air from the pasageways to the output duct without passing through the heat storage core.

13. A method for heating air of a household by radiant solar energy in a system having an exposed glazed enclosure, a radiant heat collector having an upstanding enclosure provided with flat glazed panels joined together, collector means provided within the enclosure and upstanding therewith, said collector means including heat absorbent flat walls spaced inwardly from the glazed panels; a heat storage core provided centrally within the collector and spaced from the walls of said collector, the heat storage core further comprising an insulated housing and heat retaining means within the housing, which comprises:

passing air to be heated through said collector means within the glazed enclosure, passing the air downwardly along the heat absorbent walls of said collector means;

passing the air upwardly through a heat storage core, and drawing the air from the heat storage core downwardly to said household to be heated.

* * * * *